United States Patent Office 3,331,854
Patented July 18, 1967

3,331,854
NOVEL FURAN AND THIOPHENE COMPOUNDS
Kenneth Robert Huffman and Edwin Fisher Ullman, Stamford, Conn., assignors to American Cyanamid Company, Stamford, Conn., a corporation of Maine
No Drawing. Filed Dec. 14, 1964, Ser. No. 418,336
9 Claims. (Cl. 260—330.5)

ABSTRACT OF THE DISCLOSURE

Benzofuran and thiophene compounds of the formula:

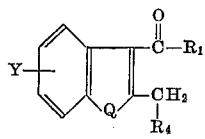

wherein Q is oxygen or sulfur, $R_1$ and $R_4$ are phenyl or mono-substituted phenyl, and Y typically is hydrogen. The compounds are useful in preparing photochromic cyclohexadiene compounds by reaction with tetracyanoethylene in basic medium.

---

This invention relates to novel benzofuran and thiophene compounds and to processes for preparing the same.

More particularly, this invention relates to novel compounds of the formula:

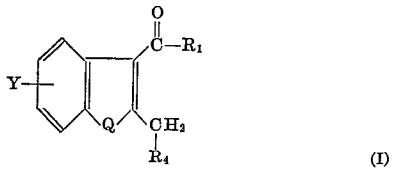

wherein Q is selected from the group consisting of oxygen and sulfur and $R_1$ and $R_4$ are selected from the group consisting of phenyl and substituted phenyl, said substituents for phenyl being selected from the group consisting of lower alkyl, lower alkyl thio, cyano, nitro, di(lower alkyl) amino, halogen and trifluoromethyl, and Y is selected from the group consisting of hydrogen, hydroxy, lower alkyl, trifluoromethyl, lower alkoxy, lower alkyl thio, cyano, nitro, halogen, di(lower alkyl)amino, phenyl and lower alkyl-substituted phenyl. In the above formula $R_1$ and $R_4$ may be the same or different.

Compounds represented by generic Formula I above are prepared by the condensation of benzo[b]thiophenes or benzo[b]furans with the appropriate aroyl derivative in the presence of a Friedel-Crafts type catalyst as follows:

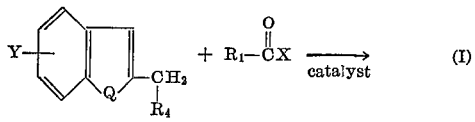

wherein Y, Q, $R_1$ and $R_4$ are the same as set forth above and X is a "leaving" group such as halogen, e.g., bromine or chlorine; methyl sulfonoxy, p-toluene sulfonoxy, and the like. By a "leaving" group is meant an element or radical which does not become a portion of product (I).

The reactants are known materials. As typical may be mentioned the preparation of 2-benzylbenzo[b]furan by the method of M. Bisogni et al., J. Chem. Soc., 3693 (1955), and the preparation of 2-benzylbenzo[b]thiophene by the method of Royer et al., Bull. Soc. Chim. [5], 28 1534 (1961).

Compounds of Formula I are conveniently prepared by mixing the starting furan or thiophene with the aroyl derivative and thereafter adding the catalyst, preferably in portions over several minutes, e.g., 2 to 10 minutes. The reactants are employed in substantially equimolecular amounts and the catalyst in amounts sufficient to effect catalytic action. Preferably, the catalyst will also be employed in equimolecular amounts with the starting compounds. No particular advantage is gained by varying the quantities of starting compounds or catalyst although substantially less or greater amounts than equimolecular proportions may be employed, if desired, for control of the rate of reaction and yield.

The reaction is preferably conducted in an inert organic solvent medium; however, in those cases where the catalyst is itself a solvent for the reactants, no other solvent is necessary. Preferred inert organic solvents, when employed, are the non-polar type, among which may be mentioned hydrocarbons such as benzene, toluene and the like, and substituted hydrocarbons such as disulfide, chloroform, chlorobenzene, nitrobenzene, dichloroethylene, and the like.

Time and temperature of reaction are not critical. Thus, reaction may be effected at from about 0° C. to 100° C. or higher for from about 30 minutes to 24 hours, the exact duration and temperature depending on the choice of reactants, catalyst and solvent. Room temperature for several hours are the preferred reaction conditions.

The catalyst may be characterized as a Lewis acid of the type commonly known as Friedel-Crafts catalysts. These are generally halides of aluminum, tin, antimony, zinc, and gallium, including the anhydrous forms of these compounds. Among this known class of catalysts may be mentioned $SnCl_4$, $ZnCl_2$, $AlCl_3$, $SbCl_5$, $GaCl_3$ and the corresponding bromides. The weaker catalysts are preferred, e.g., stannic chloride, $SnCl_4$. It is thought that the catalyst operates to loosen or break the carbon-halogen bond in the aroyl reactant, making the latter reagent more electrophilic and therefore a more effective attacking reagent for the furan or thiophene starting material. However, this consideration of mechanism is not to be construed as a limitation on the instant invention.

Conventional separation and purification procedures are employed to isolate product (I) and include filtration, evaporation, solvent extraction, crystallization, and the like.

The procedures defined above may be run at atmospheric, subatmospheric or superatmospheric pressure. Likewise, the procedures may be batch, semi-continuous or continuous and the sequence of addition of the reactants to one another is not critical.

The instant compounds are useful as starting materials in the preparation of some of the novel photochromic cyclohexadiene compounds of copending case Ser. No. 418,337, filed on the same day and incorporated herein by reference.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

Analysis: Calc'd for $C_{22}H_{16}OS$: C, 80.46; H, 4.91; S, 9.76. Found: C, 80.09; H, 5.22; S, 10.02.

EXAMPLES 3–20

Table I below summarizes reaction conditions for the preparation of other illustrative compounds of this invention, said preparations being substantially in accordance with those of Examples 1 and 2.

TABLE I

| Ex. No. | Y | Q | R₁ | R₄ | X | Catalyst | Solvent | Temp., °C. |
|---|---|---|---|---|---|---|---|---|
| 3 | 5-C₂H₅ | O | o-C₆H₅N(C₃H₇)₂ | o-C₆H₄SC₂H₅ | Cl | SnCl₄ | Dichloroethylene | 20 |
| 4 | 7-OC₃H₇ | O | m-C₆H₄CF₃ | p-C₆H₄NO₂ | Cl | SnCl₄ | CS₂ | 46 |
| 5 | 6-Br | O | p-C₆H₄Cl | o-C₆H₄OH | Cl | AlCl₃ | CS₂ | 46 |
| 6 | 6-CF₃ | O | p-C₆H₄OCH₃ | m-C₆H₄CN | Cl | SbCl₅ | CHCl₃ | 25 |
| 7 | 4-C₆H₅ | S | o-C₆H₄SCH₃ | o-C₆H₄C₂H₅ | Br | ZnBr₂ | Chlorobenzene | 120 |
| 8 | 4-CN | S | o-C₆H₄CN | o-C₆H₄CF₃ | Cl | GaCl₃ | Toluene | 50 |
| 9 | 5-NO₂ | S | m-C₆H₄CH₃ | m-C₆H₄N(C₂H₅)₂ | Cl | SnCl₄ | Xylene | 25 |
| 10 | 6-SCH₃ | S | o-C₆H₄NO₂ | m-C₆H₄Br | Br | SnCl₄ | SnCl₄ | 0 |
| 11 | 7-C₆H₄CH₃ | S | m-C₆H₄NO₂ | p-C₆H₄OCH₃ | Cl | SnCl₄ | SnCl₄ | 5 |
| 12 | 6-OH | O | p-C₆H₄NO₂ | C₆H₅ | Br | AlBr₂ | Benzene | 10 |
| 13 | 6-N(CH₃)₂ | O | C₆H₅ | p-C₆H₄NO₂ | Cl | GaBr₃ | do | 50 |
| 14 | 6-CN | S | p-C₆H₄N(CH₃)₂ | C₆H₅ | Cl | SnCl₄ | Nitrobenzene | 25 |
| 15 | H | O | p-C₆H₄N(CH₃)₂ | C₆H₅ | Cl | SnCl₄ | CS₂ | 10 |
| 16 | H | O | p-C₆H₄CN | C₆H₅ | Br | SnCl₄ | CS₂ | 10 |
| 17 | H | S | C₆H₅ | p-C₆H₄N(CH₃)₂ | Cl | SnCl₄ | Benzene | 25 |
| 18 | H | S | C₆H₅ | p-C₆H₄CN | Cl | SnCl₄ | do | 40 |
| 19 | 6-N(CH₃)₂ | O | C₆H₅ | C₆H₅ | Cl | SnCl₄ | Toluene | 25 |
| 20 | 6-CN | S | C₆H₅ | C₆H₅ | Cl | SnCl₄ | Nitrobenzene | 25 |

EXAMPLE 1

*Preparation of 3-benzoyl-2-benzylbenzo[b]furan*

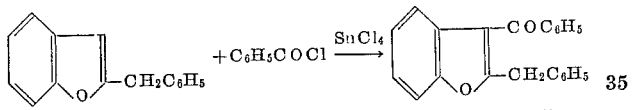

A solution of 17.0 grams (0.082 mole) of 2-benzylbenzo[b]furan and 12.7 grams of benzoyl chloride (0.090 mole) in 50 ml. of carbon disulfide was swirled in a suitable reaction vessel disposed in an ice bath while 9.6 ml. (21.5 grams, 0.082 mole) of stannic chloride was added in portions during 5 minutes. After 18 hours at room temperature the mixture was concentrated under a stream of nitrogen and the resulting black tar was taken up in chloroform. The solution was washed twice with cold 6 N HCl and then twice with 5% sodium carbonate and dried over sodium sulfate. The dark oil resulting from evaporation was crystallized from ether-petroleum ether in several crops to give a total of 6.30 grams, M.P. 106–110° C. (25% yield). The analytical sample was recrystallized from ether; M.P. 110–111° C.

Analysis: Calc'd for $C_{22}H_{16}O_2$: C, 84.59; H, 5.16. Found: C, 84.36; H, 5.30.

EXAMPLE 2

*Preparation of 3-benzoyl-2-benzylbenzo[b]thiophene*

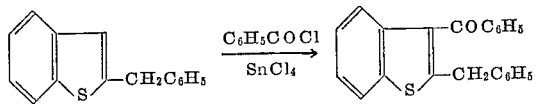

To a solution of 9.1 grams of 2-benzylbenzo[b]thiophene (0.041 mole) and 7.0 grams of benzoyl chloride (0.050 mole) in 150 ml. of benzene in a suitable reaction vessel was added 5.8 ml. (0.050 mole) of stannic chloride. After two days at room temperature, crushed ice was added followed by 6 N HCl. The mixture was shaken occasionally until it reached room temperature and then heated on a steam bath with shaking for a few minutes. The organic layer was separated and washed with 6 N HCl and then twice with 5% sodium carbonate. The dried solution was evaporated to an acid which was chromatographed twice, using a column packed with neutral alumina, by eluting with ether. The resulting oil was finally crystallized from petroleum ether to give 0.9 gram (7% yield) of pale yellow crystals, M.P. 79–81° C.

We claim:

1. A compound of the formula

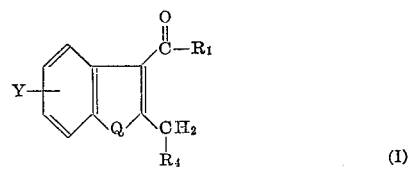

wherein Q is selected from the group consisting of oxygen and sulfur and $R_1$ and $R_4$ are selected from the group consisting of phenyl and mono-substituted phenyl, said substituents for phenyl being selected from the group consisting of lower alkyl, lower alkyl thio, cyano, nitro, di(lower alkyl)amino, halogen and trifluoromethyl, and Y is selected from the group consisting of hydrogen, hydroxy, lower alkyl, trifluoromethyl, lower alkoxy, lower alkyl thio, cyano, nitro, halogen, di(lower alkyl)amino, phenyl and lower alkyl-substituted phenyl.

2. 3-benzoyl-2-benzylbenzo[b]furan.
3. 3-benzoyl-2-benzylbenzo[b]thiophene.
4. 3 - benzoyl - 2-(p-dimethylaminobenzyl)benzo[b]furan.
5. 3-benzoyl-2-(p-cyanobenzyl)benzo[b]furan.
6. 2 - ( p - dimethylaminobenzyl)-3-benzoylbenzo[b]thiophene.
7. 2-benzyl-3-(p-cyanobenzoyl)benzo[b]thiophene.
8. 6-dimethylamino-2-benzyl-3-benzoylbenzo[b]furan.
9. 6-cyano-2-benzyl-3-benzoylbenzo[b]thiophene.

References Cited

UNITED STATES PATENTS 3,012,042   12/1961   Buu Hoi et al. _____ 260—346.2

FOREIGN PATENTS 1,076,702   3/1960   Germany.

OTHER REFERENCES

Williams, Detoxication Mechanisms (1957), p. 194 relied on. Hartough, Thiophene and its Derivatives (1952), pp. 322 and 325.

WALTER A MODANCE, *Primary Examiner.*

CECELIA SHURKO, *Assistant Examiner.*